(12) United States Patent
Tinnakornsrisuphap et al.

(10) Patent No.: US 8,325,687 B2
(45) Date of Patent: Dec. 4, 2012

(54) TECHNIQUES FOR ENHANCED BACKHAUL FLOW CONTROL

(75) Inventors: Peerapol Tinnakornsrisuphap, San Diego, CA (US); Mehmet Yavuz, San Diego, CA (US); Ramin Rezaiifar, San Diego, CA (US); Vikram Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 12/436,421

(22) Filed: May 6, 2009

(65) Prior Publication Data

US 2009/0279482 A1    Nov. 12, 2009

Related U.S. Application Data

(60) Provisional application No. 61/052,133, filed on May 9, 2008.

(51) Int. Cl.
*H04L 12/28* (2006.01)
*H04J 3/00* (2006.01)
*H04M 1/00* (2006.01)
*G06F 15/16* (2006.01)

(52) U.S. Cl. ........ 370/337; 370/230; 370/236; 370/249; 370/329; 370/396; 370/468; 370/395.1; 455/440; 455/456.3; 709/226; 709/228

(58) Field of Classification Search .......... 370/337–503; 455/440–456.3; 709/226–228
See application file for complete search history.

(56) References Cited

U.S. PATENT DOCUMENTS

| | | | | |
|---|---|---|---|---|
| 5,594,729 | A * | 1/1997 | Kanakia et al. | 370/391 |
| 6,834,053 | B1 * | 12/2004 | Stacey et al. | 370/395.4 |
| 6,901,593 | B2 * | 5/2005 | Aweya et al. | 718/104 |
| 7,023,866 | B2 | 4/2006 | Giroux et al. | |
| 7,047,310 | B2 | 5/2006 | Bedekar et al. | |
| 7,088,678 | B1 * | 8/2006 | Freed et al. | 370/230 |
| 7,237,007 | B2 | 6/2007 | Kamath et al. | |
| 7,263,371 | B2 * | 8/2007 | Das et al. | 455/456.1 |
| 7,499,437 | B2 * | 3/2009 | Das et al. | 370/338 |

(Continued)

FOREIGN PATENT DOCUMENTS

RU    2298881    5/2007

(Continued)

OTHER PUBLICATIONS

International Search Report—PCT/US09/043095, International Search Authority—European Patent Office—Jul. 21, 2009.

(Continued)

*Primary Examiner* — Phirin Sam
*Assistant Examiner* — Venkatesh Haliyur
(74) *Attorney, Agent, or Firm* — D. Scott Juneau

(57) ABSTRACT

Techniques for enhanced backhaul flow control are provided. In an exemplary embodiment, a backhaul control system is described that comprises a base station controller (BSC), a backhaul network, and a base transceiver station (BTS). Each is responsive to data and messaging transmitted and received. In one aspect, the BTS includes a queue and a controller. The amount of data in a queue is adjusted by a controller based upon calculating a target queue size value. The controller non-uniformly adjusts the amount of data in a queue based upon a target queue size value which is based upon communication system parameters. The target queue size and amount of data in a queue is adjusted so as to reduce buffer underrun, decrease system latency, and increase communication system throughput.

31 Claims, 7 Drawing Sheets

U.S. PATENT DOCUMENTS

| | | | |
|---|---|---|---|
| 7,542,478 B1* | 6/2009 | Ozer et al. | 370/447 |
| 7,653,034 B2* | 1/2010 | Chau et al. | 370/338 |
| 7,676,223 B2* | 3/2010 | Das et al. | 455/422.1 |
| 7,706,403 B2* | 4/2010 | Hosein | 370/468 |
| 8,060,681 B2* | 11/2011 | Russo et al. | 710/306 |
| 2005/0111361 A1* | 5/2005 | Hosein | 370/230 |
| 2006/0056365 A1* | 3/2006 | Das et al. | 370/338 |
| 2006/0058038 A1* | 3/2006 | Das et al. | 455/456.1 |
| 2006/0058056 A1* | 3/2006 | Das et al. | 455/524 |
| 2006/0099990 A1* | 5/2006 | Chau et al. | 455/558 |
| 2007/0191054 A1* | 8/2007 | Das et al. | 455/525 |
| 2007/0207811 A1* | 9/2007 | Das et al. | 455/450 |
| 2009/0122700 A1* | 5/2009 | Aboba et al. | 370/230 |
| 2009/0147737 A1* | 6/2009 | Tacconi et al. | 370/329 |
| 2009/0161547 A1* | 6/2009 | Riddle et al. | 370/236 |
| 2009/0279482 A1* | 11/2009 | Tinnakornsrisuphap et al. | 370/328 |
| 2010/0040019 A1* | 2/2010 | Tinnakornsrisuphap et al. | 370/331 |
| 2010/0040038 A1* | 2/2010 | Tinnakornsrisuphap et al. | 370/345 |
| 2011/0189986 A1* | 8/2011 | Tinnakornsrisuphap et al. | 455/422.1 |
| 2011/0189995 A1* | 8/2011 | Tinnakornsrisuphap et al. | 455/436 |
| 2012/0094660 A1* | 4/2012 | Radulescu et al. | 455/434 |

FOREIGN PATENT DOCUMENTS

| | | |
|---|---|---|
| WO | WO2006006208 A1 | 1/2006 |
| WO | WO 2009137650 A1 * | 11/2009 |

OTHER PUBLICATIONS

Written Opinion—PCT/US09/043095, International Search Authority—European Patent Office—Jul. 21, 2009.

Taiwan Search Report—TW098115374—TIPO—Jul. 15, 2012.

* cited by examiner

TECHNIQUES FOR ENHANCED BACKHAUL FLOW CONTROL

CLAIM OF PRIORITY UNDER 35 U.S.C. §119

The present Application for Patent claims priority to Provisional Application No. 61/052,133 entitled, "ENHANCED BACKHAUL FLOW CONTROL FOR MULTI-CARRIER WIRELESS SYSTEMS", filed May 9, 2008, and assigned to the assignee hereof and hereby expressly incorporated by reference herein.

TECHNICAL FIELD

The present disclosure relates generally to communication systems, and more specifically to enhanced backhaul flow control.

BACKGROUND

Communication systems, in particular wireless communication systems, are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

A wireless multiple-access or multi-carrier communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations.

In order to increase radio resource efficiency, multiple-carrier systems are implemented by allowing data traffic to flow over multiple carriers at the same time. The result is an increase in system efficiency and performance and a decrease in overall system latency. It is known in the art that combining of resources offers statistical trunking gains.

Therefore, multi-carrier systems that optimize system operation and flow control to allow the maximum statistical trunking gains are desired.

SUMMARY

Techniques for enhanced backhaul flow control are provided. In an exemplary embodiment, a backhaul control system is described that comprises a base station controller (BSC), a backhaul network, and a base transceiver station (BTS). Each is responsive to data and messaging transmitted and received. In one aspect, the BTS includes a queue and a controller. The amount of data in the queue is adjusted by a controller based upon calculating a target queue size value. The controller non-uniformly adjusts the amount of data in the queue based upon the target queue size value which is based upon communication system parameters. The target queue size and amount of data in a queue is adjusted so as to reduce buffer underrun, decrease system latency, and increase communication system throughput.

Various other aspects and embodiments of the disclosure are described in further detail below.

The summary is neither intended nor should it be construed as being representative of the full extent and scope of the present disclosure, which these and additional aspects will become more readily apparent from the detailed description, particularly when taken together with the appended drawings.

Figure 1:
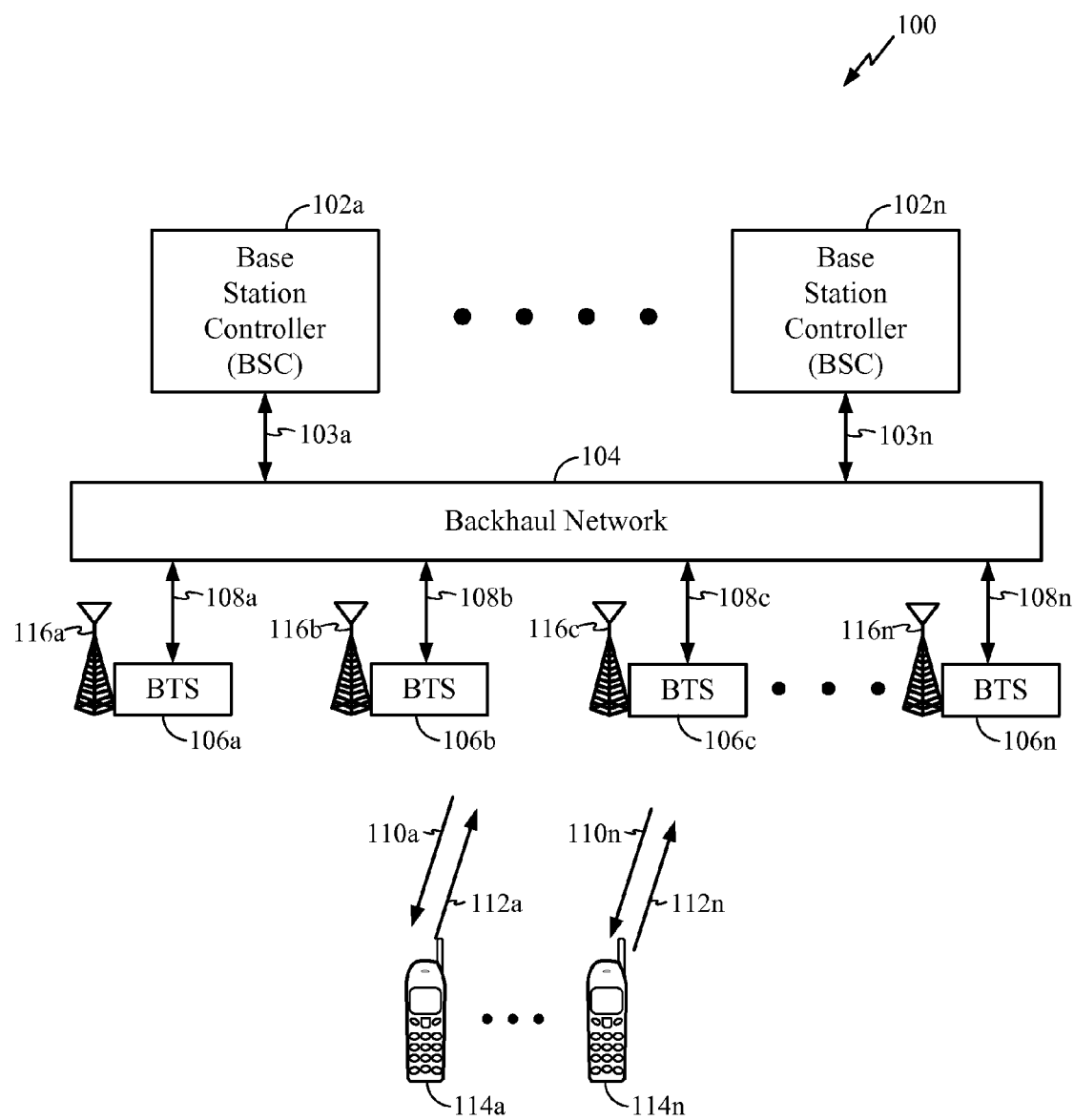
FIG. 1 shows a block diagram of a multi-carrier IP based wireless communication system.

To facilitate understanding, identical reference numerals have been used, where possible to designate identical elements that are common to the figures, except that suffixes may be added, when appropriate, to differentiate such elements. The images in the drawings are simplified for illustrative purposes and are not necessarily depicted to scale.

The appended drawings illustrate exemplary configurations of the disclosure and, as such, should not be considered as limiting the scope of the disclosure that may admit to other equally effective configurations. Correspondingly, it has been contemplated that features of some configurations may be beneficially incorporated in other configurations without further recitation.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Cdma2000 is described in documents from an organization named "3rd Generation Partnership Project 2" (3GPP2). These various radio technologies and standards are known in the art. Internet protocol (IP) is also used to describe the general class of communication systems as is known in the art which use packets of data for transmission and reception.

FIG. 1 shows a block diagram of a multi-carrier IP based wireless communication system 100. Those skilled in the art would appreciate that only those functional parts of wireless system 100 are depicted to facilitate the description of the present exemplary embodiment. Those skilled in the art will also understand that the present exemplary embodiment may also apply to non-wireless communication systems where there is flow of digital information using data packets over an IP network. Furthermore, backhaul flow control, as known in the art, describes the control system in a communication system which directs the movement of data with respect to timing or other predetermined events.

Wireless system 100 is comprised of one or multiple base station controllers (BSCs) 102a, . . . , 102n. Each BSC 102 is coupled to backhaul network 104 using internet protocol (IP) over respective backhaul connection 103a, . . . , 103n. Backhaul connections 103 are comprised of technologies known in the art (e.g. T1, T3, Wireless).

Coupled to backhaul network 104 are base transceiver stations (BTSs) 106a, 106b, . . . , 106n through respective coupling connections 108a, 108b, . . . , 108n. Backhaul network 104 is a network known in the art (e.g. internet, ATM, Frame relay). Coupling connections 108 are further comprised of technologies known in the art.

BSCs 102 send and receive wireless network data and control signals over backhaul network 104 to and from BTSs 106. BTSs 106 transmit data over a wireless carrier downlinks (downlink signals) 110a, . . . , 110n to access terminals (ATs) 114a, . . . , 114n. BTSs 106 further receive data over wireless carrier uplinks (uplink signal) 112a, . . . , 112n. Access terminals 114 may also be referred to as user equipment (UE), wireless communication devices, terminals, access terminals or some other terminology.

Multi-carrier IP based wireless communication system 100 allows for simultaneous transmission of data using a plurality of downlink signals 110 to any access terminal 114 to increase data throughput, decrease latency, and improve system throughput performance. The plurality of downlink signals 110 may be over a frequency division duplexing (FDD) link or over multiple carriers within a single BTS.

Each BTS may be comprised of multiple input multiple output (MIMO) antenna configurations or may be comprised of a plurality of antenna sectors configurations, as is known in the art. Multi-carrier systems employ radio link control (RLC) using a radio link protocol (RLP) as known in the art.

Multi-carrier wireless systems are used in the art because they offer better wireless resource utilization, better system latency, and improved connection speed. Wireless systems transmit information over a lossy channel and this information is subject to data errors. When data errors are present in the received downlink signal 110, AT 114 will send an automatic retransmit request (ARQ) to the corresponding BTS 106 to request corresponding BSC 102 to retransmit the information that was received in error. Wireless system 100 is IP based and utilizes data packets that can vary in size in the transport of data as is known in the art. Blocks of data that are transmitted by BSC 102 may be split up into smaller blocks and distributed among a plurality of BTSs 106. Enhanced backhaul flow control in the exemplary embodiment results in lower latency, higher system throughput, and reduced buffer underrun.

One skilled in the art would appreciate that enhanced flow control may be implemented in all BTSn, for n=1, 2, 3, . . . , n or may be implemented in a subset of BTSn, allowing for system flexibility.

Figure 2:
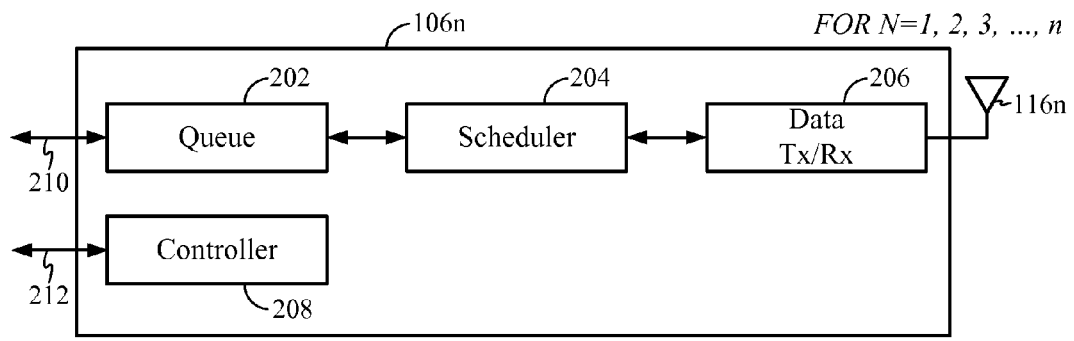
FIG. 2 shows a block diagram of a BTS within the multi-carrier IP based wireless communication system.

FIG. 2 shows a block diagram of a BTS within the multi-carrier IP based wireless communication system. Controller 208 communicates bi-directionally with any particular BSC 102 over backhaul network 104 as described above. Packet data 210 from any particular BSC 102 feeds queue 202 with information that is to be transmitted over the wireless channel.

Queue 202 may be comprised of multiple queues as any single BTS 106 may be implementing a multi-carrier wireless system. Queue 202 feeds scheduler 204 (which may also be comprised of multiple schedulers) which schedules in time how data will be transmitted at the respective carrier and may dynamically adjust its scheduling to accommodate varying channel conditions, access terminal 114 loading, multiple access terminals 114a, . . . , 114n, transmit power, and other parameters as is known in the art. Controller 208 may receive information from any particular BSC 102. Scheduler 204 feeds data Tx/Rx 206 which implements the physical layer of the system and transmits and receives wireless information as is known in the art. Multi-carrier systems utilize multiple queues for a particular data block that is being transmitted over the IP wireless system. Packet data 210 may comprise a sub-block of a larger block of data, as split up by a particular BSC to facilitate multi-carrier transmission of the data. AT 114 receives the over-the-air transmission and decodes the received data. In a multi carrier wireless system, packets may arrive at access terminal 114 out of order (for example, because some data packets are transmitted on carriers that have a higher throughput) so that any particular block of data may be incomplete. Out of order data is known in the art as "skew" while missing data is known as erasure. Radio link protocol (RLP) is the term known in the art for providing reliable in-order delivery of a data stream from BSC 102 to AT 114. RLP is needed because higher level protocols such as TCP may not be able to accommodate unpredictable and unreliable data transmission events typically found in wireless systems. Also as known in the art for multi-link multi-flow radio link protocol (RLP), AT 114 typically waits for some pre-determined time T after detecting a gap in received data. If after time T, AT 114 determines there is missing or erroneous data packets, AT 114 will send a negative acknowledgement (NACK) through the uplink signals 112 through corresponding BTS 106 over backhaul network 104 to corresponding BSC 102 to retransmit the lost data. Data retransmissions that occur due to lost data can negatively impact overall wireless system 100 throughput performance and are undesired. One solution is to use a significantly large time T to wait for packets that may still arrive late. If T is chosen to be significantly large, system latency may significantly increase when erasure occurs. Therefore it is important to minimize T while simultaneously minimizing skew. Skew, as is known in the art, is the arrival of data packets out of order than was originally transmitted. One method for wireless system optimization is to dynamically change the value of T. In practice, optimal values of T cannot be selected in a deterministic manner due to factors such as sector loading, channel conditions, and variable round trip delays that are not easily calculated. It is desired to increase system efficiency and decrease data retransmission due to out of order or lost data in an adaptive manner. In accordance with the exemplary embodiment, the size of queue 202 may be adaptively adjusted to minimize skew. If queue 202 is made too small, undesirable buffer underrun occurs. Buffer underrun, as is known in the art, is defined as a lack of data at queue 202 while BTS 106 has sufficient physical layer resources to transmit more data and BSC 102 still has data available for transmission to AT 114.

Flow control, as is known in the art, is a mechanism for controlling the flow of data from a source to a destination. In wireless communication systems, flow control is used to regulate data transmission from BSC 102 through backhaul network 104 to BTS 106. Typical flow control in wireless systems uses a closed loop mechanism where BTS 106 is able to send an acknowledgement message to BSC 102. As someone skilled in the art would appreciate, the flow control window is the amount of data that can be transmitted without any acknowledgement by BTS 106. Flow control is used in multi-carrier wireless systems where there are a plurality of BTS 106 and each BTS 106 may have varying ability to process data from BSC 102 due to hardware, software, and operating constraints. After each flow control window transmission is complete, BTS 106 can acknowledge the data transmission to BSC 102 as well as passing additional informational messages. The terms "flow control window" and "target queue" are synonymous and references to the "size of the queue" and "target queue size" are terms used to describe flow control and flow control windows, as appreciated by those skilled in the art.

Figure 3:
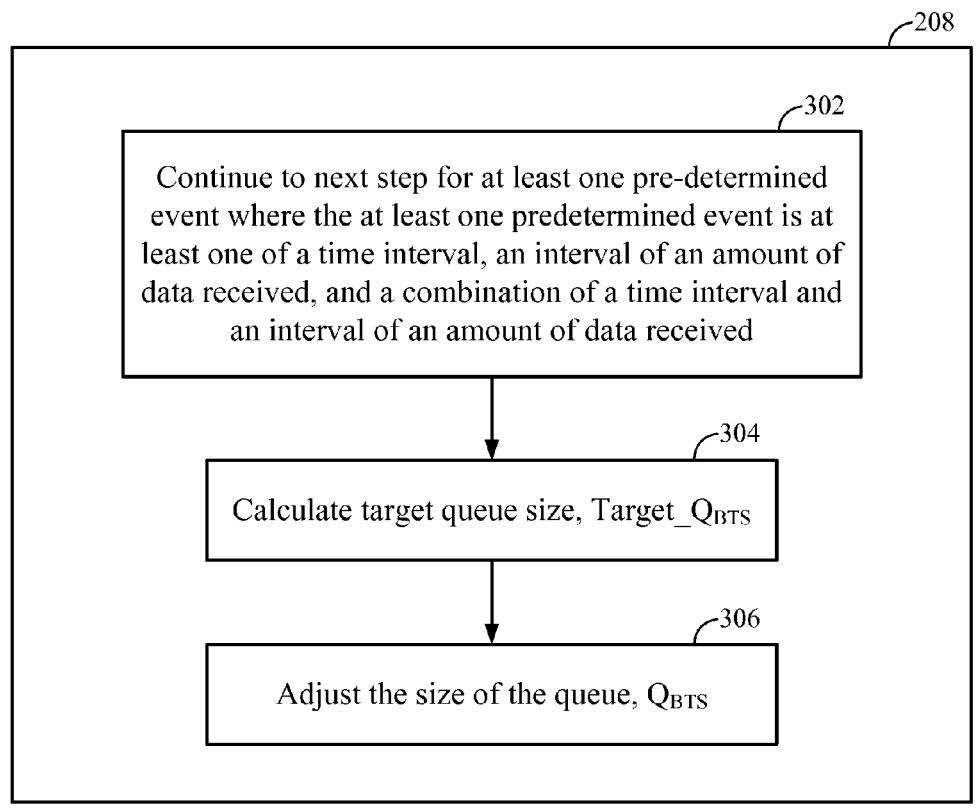
FIG. 3 shows a process for enhanced flow control performed by the BTS controller in accordance with an exemplary embodiment.

FIG. 3 shows a process for enhanced flow control performed by the BTS controller. The exemplary embodiment applies to an internet protocol (IP) based communication system configured to operate in at least one of an internet protocol version 4 (IPv4) system and internet protocol version 6 (IPv6) system.

Flow block 302 waits for incoming data into queue 202 for at least one predetermined event where the at least one predetermined event is at least one of a time interval, an interval of an amount of data received, and a combination of a time interval and an interval of an amount of data received. Flow then continues to block 304 wherein controller 208 calculates a target queue size (Target_$Q_{BTS}$) for at least one predetermined event, as defined above. Flow then moves to block 306 where controller 208 adjusts in a non-uniform manner the size of the queue ($Q_{\_BTS}$) based upon the calculated target queue size for at least one predetermined event. Note that adjusting of the size of the queue ($Q_{\_BTS}$) is performed indirectly by BTS 106 by managing the requests for data transmission to BSC 102. If the size of the queue is to be increased, BTS 106 will transmit a message to BSC 102 to send more data. If the size of the queue is to be decreased, BTS 106 will transmit a message to BSC 102 at each flow control window to decrease the amount of data to be sent.

In accordance with the exemplary embodiment, the following parameters and variables are defined in the table below:

| | |
|---|---|
| $Q_{BTS}$ | The current queue size or amount of data in a queue at the BTS in bytes. |
| $Q_{BSC}$ | The current queue size at the BSC in bytes. |
| Target_$Q_{BTS}$ | The target queue size at the BTS in bytes. |
| Current_Bytes | The current number of bytes that have been sent by the scheduler to AT 114 |
| Bytes_since_last_request | The number of bytes that have been transmitted since the last flow control request by the BTS. |
| FC_Bytes_Trigger | The number of bytes to be served before the next flow control request is transmitted from the BTS. |
| Target_$Q_{BTS}$_Freeze | Status flag that when set to logical "true" (1) will signal to BTS to not change Target_$Q_{BTS}$ |
| $Q_{BTS}$_Thresh | The threshold in bytes where Target_$Q_{BTS}$ will be adjusted |
| k | Constant used to control the number of flow control requests. |
| Min_Target_$Q_{BTS}$ | Minimum size in bytes of Target_$Q_{BTS}$, nominally set to $Q_{BTS}$_Thresh/(1-1/k) |
| Target_$Q_{BTS}$_DEC_CONST | Additive decrease constant in bytes. |
| Target_$Q_{BTS}$_INC_FAC | Multiplicative increase factor. |
| $Q_{max}$ | Maximum possible queue size in bytes at the BTS. |
| Last_Target_$Q_{BTS}$_Update_Timeslot | The last timeslot that Target_$Q_{BTS}$ was updated. |
| Current_Timeslot | Current time index in the BTS. |
| Freeze_Ind_Sent[i] | Flag stored in the BSC for indicated data to be transmitted for BTS 106i. |

Figure 4:
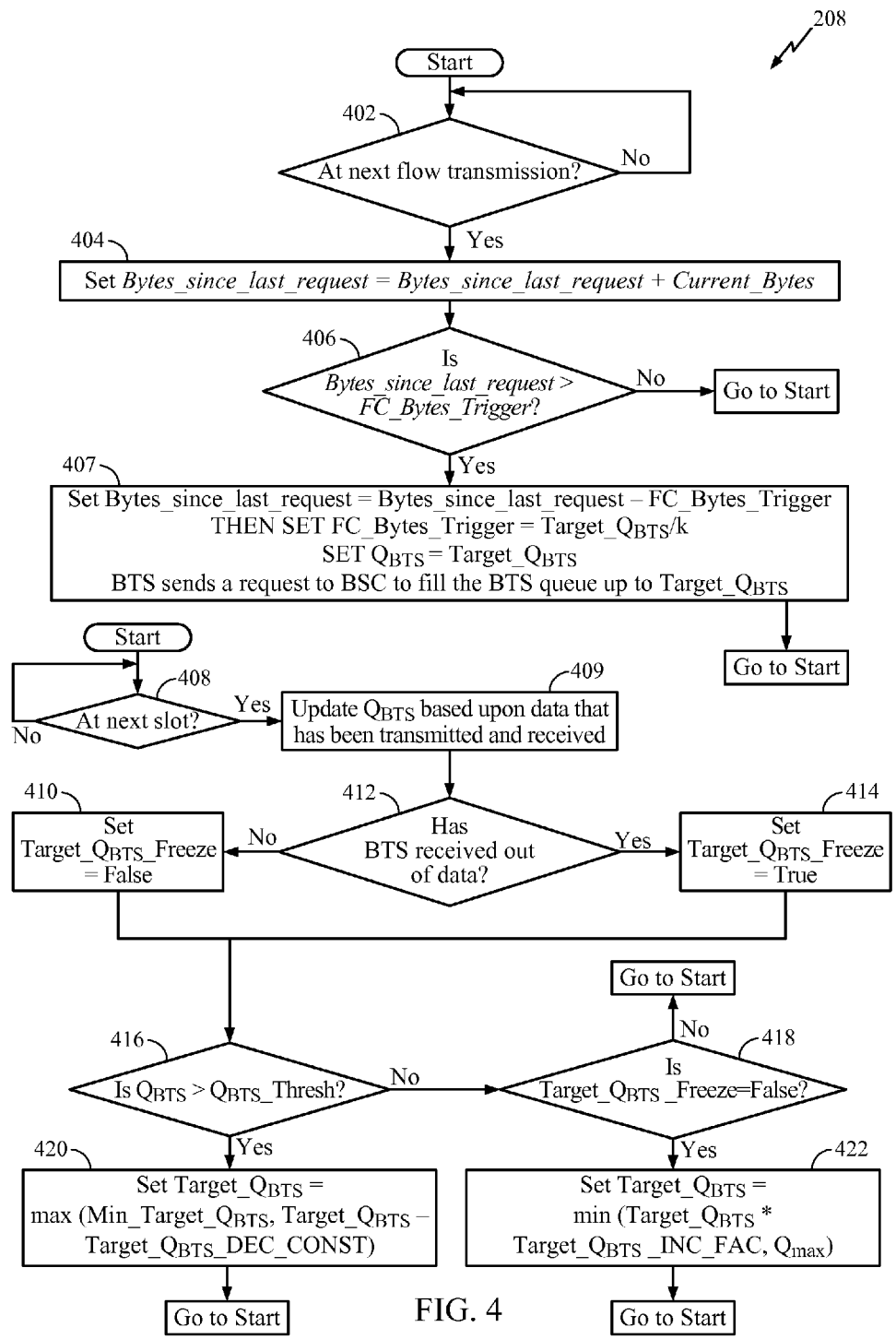
FIG. 4 shows a more detailed flow diagram of the process in FIG. 3.

FIG. 4 shows a more detailed flow diagram of the process in FIG. 3. Block waits until the next flow transmission which occurs at the end of each predetermined flow control window. Once the next flow transmission event has occurred, BTS 106 sets Bytes_since_last_request by incrementing by Current_Bytes, which is the current amount of data transmitted or received in accordance with block 404. Block 404 then triggers block 406 which checks if the bytes in the BTS queue, Bytes_since_last_request, is greater than some threshold, FC_Bytes_Trigger. Block 406 routes to the input of block 402 if the condition is not true (i.e. a "No"). If the condition is met (i.e. a "Yes"), block 406 flows to block 407. Block 407 updates Bytes_since_last_request by decrementing by FC_Bytes_Trigger, FC_Bytes_Trigger is updated to Target_$Q_{BTS}$/k, and BTS 106 sends a request to respective BSC 102 to send more data to fill up queue 202 up to Target_$Q_{BTS}$ and routes back to the input of block 402.

Simultaneously, block 408 waits for the next slot time. When enough time has elapsed so that the next slot index is reached, block 409 then updates $Q_{\_BTS}$ based upon the amount of data that has been transmitted by BTS 106 through scheduler 204 and the amount of data that has been received by BTS 106 from BSC 102. Block 408 then triggers block 409 which checks to see if BTS 106 has received an out of data signal from respective BSC 102. If the check is true (i.e. "yes") then block 409 flows to block 414 where Target_$Q_{BTS}$_Freeze is set to "TRUE," indicating that no further change of the size of BTS Queue 202 is required and the flow then moves to block 416.

If the check of block 412 is "FALSE" (i.e. "no") then flow is transitioned to block 410 and Target_$Q_{BTS}$_Freeze is set to "FALSE," indicating that further adaptation of the size of BTS queue 202 is necessary. Block 410 then transitions to conditional block 416. Block 416 checks if the size of BTS queue 202 is greater than $Q_{BTS}$_Thresh. If the check of block 416 is "TRUE" or "yes" then the target size of BTS queue 202 is too large and the target size, Target_$Q_{BTS}$, is decreased to the maximum of Min_Target_$Q_{BTS}$ or Target_$Q_{BTS}$ decreased by Target_$Q_{BTS}$_DEC_CONST as depicted in the flow of block 416 to block 420 where the decrement is completed.

After block 420 is complete, the flow couples back to the input of block 408. If the check of block 416 is "no" then flow moves to block 418 where flag, Target_$Q_{BTS}$_Freeze, is checked to see if it is "false" or "no." If the flag is "TRUE", the queue adaptivity is disabled and the flow returns to the input of block 402. If Target_$Q_{BTS}$_Freeze is "FALSE" then flow is moved to block 422 where the desired queue size, Target_$Q_{BTS}$, is incremented to the minimum of $Q_{max}$ or Target_$Q_{BTS}$ multiplied by Target_$Q_{BTS}$_INC_FAC, thereby adjusting the size of BTS queue 202 adaptively. Block 422 then flows back to the input of block 408 and the process is re-started.

The exemplary embodiment in FIG. 4 requires that Target_$Q_{BTS}$ updated by every time slot of data. Updating Target_$Q_{BTS}$ every slot may be computationally taxing on the BTS. It should be noted that $Q_{BTS}$ in the exemplary embodiment can only change if either a packet has been scheduled by scheduler 204 or a new packet has been received by BTS queue 202. Therefore, Target_$Q_{BTS}$ may be updated at a much lower rate while still achieving the overall system performance enhancements described in the exemplary embodiment. Note that in all embodiments, Bytes_since_last_request is increased by the number of bytes transmitted for the flow at every transmission for the flow.

Figure 5:
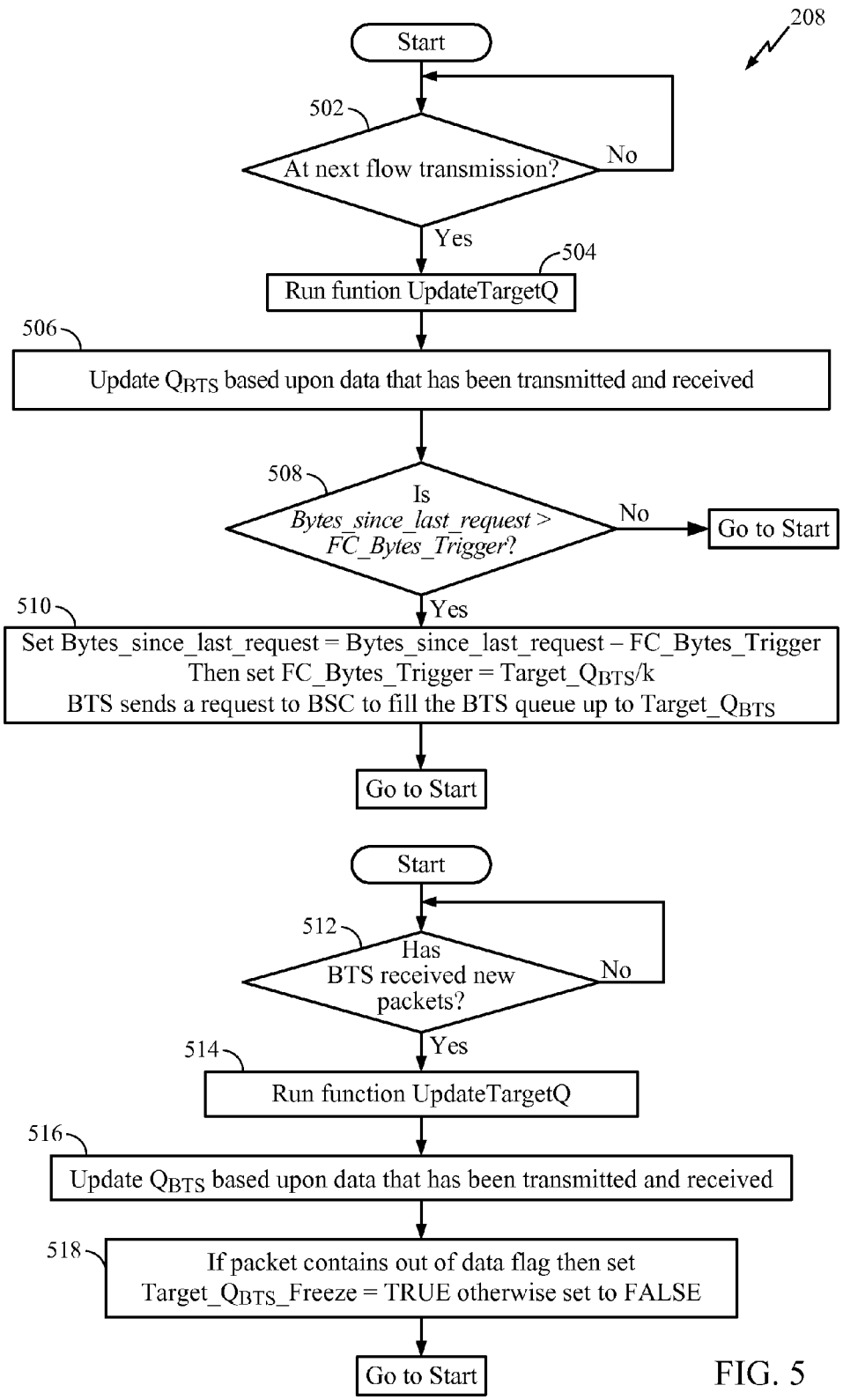
FIG. 5 shows a more detailed flow diagram for enhanced backhaul control in accordance with an alternate exemplary embodiment.

FIG. 5 shows a more detailed flow diagram for enhanced backhaul control in accordance with an alternate exemplary embodiment. The alternate exemplary embodiment decreases computational complexity by updating Target_$Q_{BTS}$ only when data is received or transmitted to or from, respectively, to BTS queue 202. The alternate exemplary embodiment of FIG. 5 begins with flow block 502 which waits for the next flow transmission event to occur. Once the next flow transmission occurs, function UpdateTargetQ is run in accordance with flow block 504. Flow then continues to block 506 where $Q_{BTS}$ is updated based upon the amount of data that has been transmitted and received into BTS queue 202.

Flow then continues to block 508 where Bytes_since_last_request is compared to FC_Bytes_Trigger. If Bytes_since_last_request is greater to FC_Bytes_Trigger then flow continues to block 510 ("yes" condition). The "yes" output of block 508 feeds block 510. Block 510 updates Bytes_since_last_request by decrementing by FC_Bytes_Trigger, FC_Bytes_Trigger is updated to Target_$Q_{BTS}$/k, and BTS 106 sends a request to respective BSC 102 to send more data to fill up BTS queue 202 up to Target_$Q_{BTS}$. The "no" output of block 508 routes back to the start or input of block 502. Similarly, Block 510 flows back to the start and block 502, to await the next flow transmission.

Simultaneously, block 512 checks if BTS 106 has received any new data packets. If it has not, it waits until it receives at least one. If the check in block 512 is "TRUE" or "yes" then flow is moved to block 514. Block 514 performs system updates by running routine UpdateTargetQ 600. Flow then continues to block 516 where Q_BTS is then updated based upon the amount of data that has been transmitted and received by queue 202. Flow then continues to block 518. Block 518 checks if any of the received packets has an out of data flag that was transmitted by BSC 102 If there is an out of data flag received by BTS 106, then Target_$Q_{BTS}$_Freeze is set to "TRUE,"otherwise it is set to "False." Block 518 then flows back to the input of block 512 and the flow is routed back to start.

Figure 6:
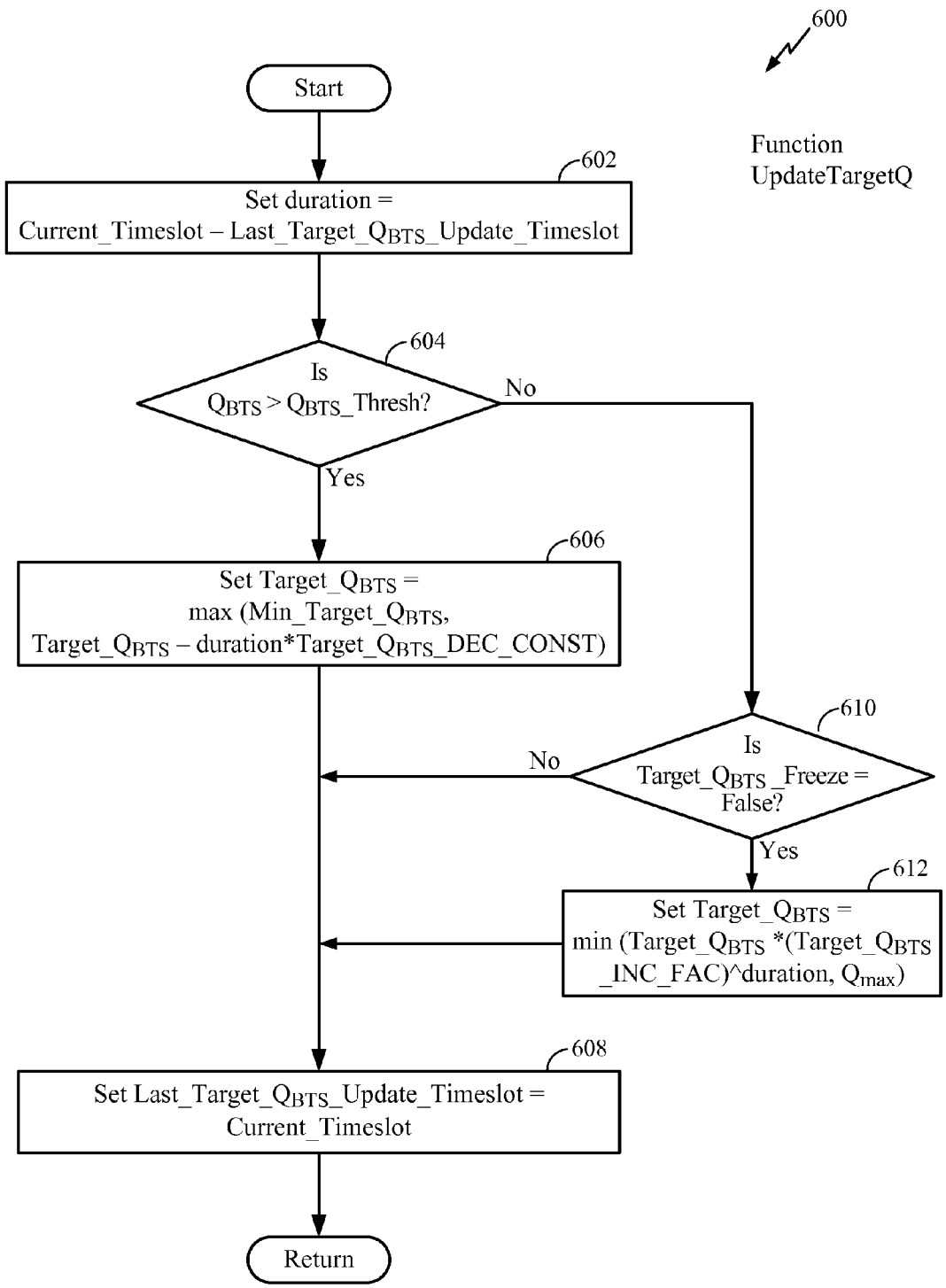
FIG. 6 shows a routine of a sub-process of updating the target queue size for enhanced flow control.

FIG. 6 shows a routine of a sub-process of updating the target queue size for enhanced flow control. Block 602 calculates and defines a time variable (duration) which is the Current_Timeslot minus Last_Target_$Q_{BTS}$_Update_Timeslot and then flow is moved to block 604. Block 604 checks if the size of BTS queue 202, $Q_{BTS}$, is greater than $Q_{BTS}$_Thresh. If the check of block 604 is "TRUE" or "yes" then the target size of BTS queue 202 is too large and the target size, Target_$Q_{BTS}$, is decreased to the maximum of Min_Target_$Q_{BTS}$ or Target_$Q_{BTS}$ decreased by the time variable, duration, multiplied by Target_$Q_{BTS}$_DEC_CONST as depicted in the flow of block 604 to block 606 where the decrement is completed. After block 606 has completed the decrement operation, flow is moved to block 608 where Last_Target_$Q_{BTS}$_Update_Timeslot is set equal to the current time, Current_Timeslot.

After completion of block 608, flow is then returned to block 514. If the check of block 604 is "FALSE" or "no" then flow is moved to block 610. Block 610 checks if Target_$Q_{BTS}$_Freeze is "FALSE." If the check by block 610 is a "yes" then flow is moved to block 612, otherwise flow is moved to block 608. If flow has moved to block 612 then the target size of BTS queue 202, Target_$Q_{BTS}$, is set to the minimum of $Q_{max}$ or Target_$Q_{BTS}$ multiplied by the value of Target_$Q_{BTS}$_INC_FAC raised to the power of the time variable, duration. After block 612 has completed operations, flow is moved to block 608.

Figure 7:
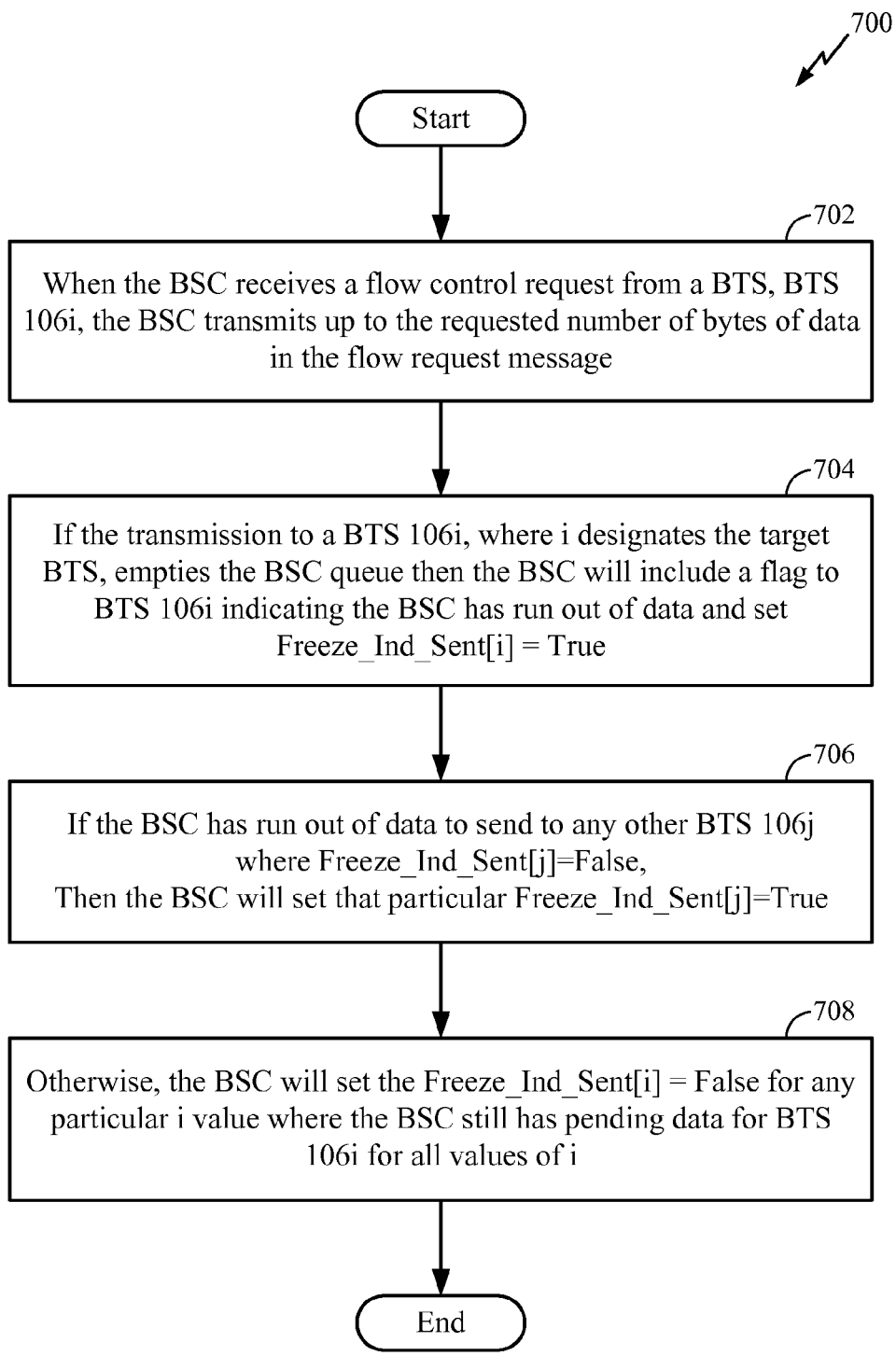
FIG. 7 shows a process for enhanced backhaul flow control performed by the BSC.

FIG. 7 shows a process 700 for enhanced backhaul flow control performed by the BSC. After start, block 702 waits for a flow control request from a BTS, BTS 106*i*, BSC 102 transmits up to the requested number of bytes of data in the flow request message. Flow then moves to block 704 where BSC 102 checks if the BSC 102 queue targeted for BTS 106*i* has been emptied.

If the queue for BTS 106*i* has been emptied, indicating that BSC 102 has run out of data to transmit to BTS 106*i*, BSC 102 sets Freeze_Ind_Sent[i] to equal "TRUE" and generates an "out of data" flag to be transmitted to BTS 106. Flow then moves to block 706 where BSC 102 checks if the queue for any other BTS 106*j* (not equal to i) has been emptied and Freeze_Ind_Sent[j] is "False." BSC 102 then sets Freeze_Ind Sent[j] equal to "TRUE."

Flow then moves to block 708 where BSC 102 will set Freeze_Ind_Sent[i] equal to "False" for any particular value of i, i=1, 2, 3 . . . where the BSC still has pending data for a particular BTS $106i$. Flow then moves to the input of block 802 and the process is begun again at the start.

Figure 8:
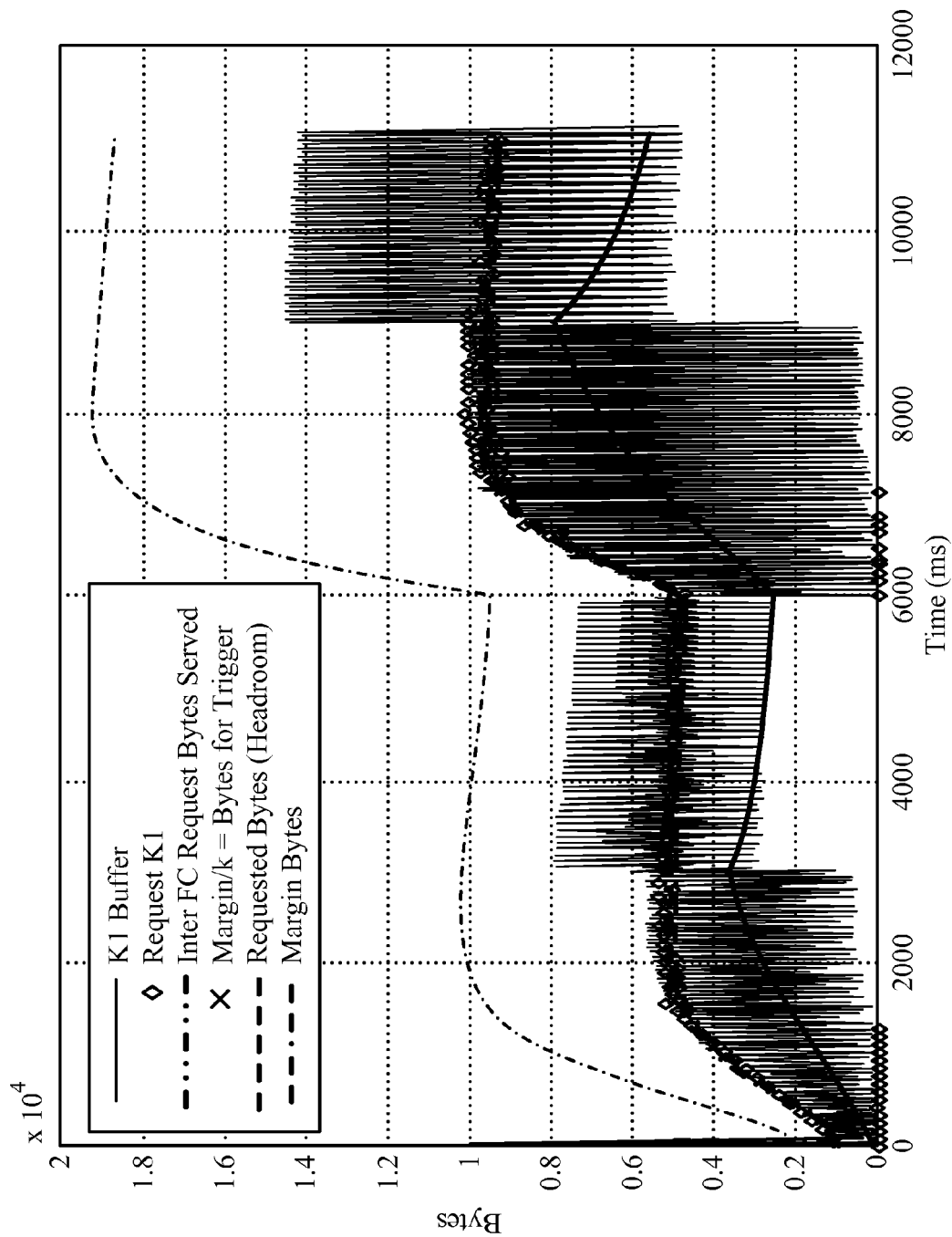
FIG. 8 graphically illustrates the adjustment of the target queue size over time.

FIG. 8 graphically illustrates the adjustment of the target queue size over time. It specifically shows the margin bytes in queue 202 being adapted over time. The adaptability is pronounced at time=6000 ms. Adjustment of the target queue size occurs for at least one pre-determined event where the at least one predetermined event is at least one of a time interval, an interval of an amount of data received, and a combination of a time interval and an interval of an amount of data received (302)

For general notation, references to BTS and BSC generally refer to any particular BTS or BSC in the wireless system 100. For example, a reference to BSC $106n$ refers to any particular BSC $106a$, $106b$, . . . , $106n$. Similarly, a reference to BTS 102 refers to any particular BTS $102a$, $102b$, . . . , $102n$. Furthermore, an implementation of the enhanced backhaul flow control techniques described herein is not required of all BTSs or BSCs in a communication system. There may be at least one BTS or BSC which does not implement enhanced backhaul flow control in accordance with the exemplary embodiments.

Those of skill in the art would understand that signals may be represented using any of a variety of different techniques. For example, data, instructions, signals that may be referenced throughout the above description may be represented by voltages, currents, electromagnetic waves, magnetic fields or particles, or any combination thereof.

Those of skill would further appreciate that the various illustrative radio frequency or analog circuit blocks described in connection with the disclosure herein may be implemented in a variety of different circuit topologies, on one or more integrated circuits, separate from or in combination with logic circuits and systems while performing the same functions described in the present disclosure.

Those of skill would also further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but are to be accorded the widest scope consistent with the principles and novel features disclosed herein.

What is claimed is:

1. A method for enhanced backhaul flow control in a communication system, comprising:
    selectively determining, by a controller at a base transceiver station (BTS) coupled to a backhaul network, whether to increase or decrease a current queue size ($Q_{\_BTS}$) for a queue at the BTS based upon operating parameters for at least one predetermined event;
    calculating, at the BTS, a target queue size (Target_$Q_{BTS}$) for the queue at the BTS based upon the selective determining increasing or decreasing the current queue size ($Q_{\_BTS}$) and further based upon the operating parameters for the at least one predetermined event, wherein the at least one predetermined event is at least one of a time interval, an interval of an amount of data received, or a combination of the time interval and the interval of the amount of data received; and
    adjusting, by the controller at the BTS in a non-uniform indirect manner, the current queue size ($Q_{\_BTS}$) for the queue at the BTS based upon the calculated target queue size, wherein adjusting the current queue size ($Q_{\_BTS}$) includes transmitting one or more messages from the BTS to a base station controller (BSC) over the backhaul network to increase or decrease an amount of data to be transmitted from the BSC to the BTS based upon the adjusted current queue size ($Q_{\_BTS}$).

2. The method of claim 1, wherein the controller adjusts the current queue size ($Q_{\_BTS}$) for the queue at the BTS to reduce latency associated with the BTS transmitting data from the queue to one or more access terminals over one or more wireless carrier downlinks.

3. The method of claim 1, wherein the controller adjusts the current queue size ($Q_{\_BTS}$) for the queue at the BTS to reduce buffer underrun associated with the BTS transmitting data from the queue to one or more access terminals over one or more wireless carrier downlinks.

4. The method of claim 1, wherein controller adjusts the current queue size ($Q_{\_BTS}$) for the queue at the BTS to increase throughput associated with the BTS communicating with one or more access terminals over one or more wireless carrier downlinks.

5. A method for enhanced backhaul flow control in a communication system, comprising:
- calculating, at a base transceiver station (BTS) coupled to a backhaul network, a target queue size (Target_$Q_{BTS}$) for a queue at the BTS based upon operating parameters for at least one predetermined event, wherein the at least one predetermined event is at least one of a time interval, an interval of an amount of data received, or a combination of the time interval and the interval of the amount of data received;
- selectively determining, by a controller at the BTS, whether to enable or disable adjustment of a current queue size ($Q\_{BTS}$) for the queue at the BTS based upon the operating parameters for the at least one predetermined event; and
- adjusting, by the controller at the BTS in a non-uniform indirect manner, the current queue size ($Q\_{BTS}$) for the queue at the BTS based upon the calculated target queue size in response to the controller enabling the adjustment of the current queue size ($Q\_{BTS}$), wherein adjusting the current queue size ($Q\_{BTS}$) includes transmitting one or more messages from the BTS to a base station controller (BSC) over the backhaul network to manage an amount of data to be transmitted from the BSC to the BTS.

6. The method of claim 1, wherein the adjusted current queue size ($Q\_{BTS}$) for the queue at the BTS has a value no smaller than a minimum ($Q\_{min}$) and no larger than a maximum ($Q\_{max}$).

7. A device for enhanced backhaul flow control in a communication system, wherein the device comprises a controller configured to:
- selectively determine whether to increase or decrease a current queue size ($Q\_{BTS}$) for a queue at a base transceiver station (BTS) coupled to a backhaul network based upon operating parameters for at least one predetermined event;
- calculate a target queue size (Target$_{13}$ $Q_{BTS}$) for the queue at the BTS based upon the controller selectively determining to increase or decrease the current queue size ($Q\_{BTS}$) and further based upon the operating parameters for the at least one predetermined event, wherein the at least one predetermined event is at least one of a time interval, an interval of an amount of data received, or a combination of the time interval and the interval of the amount of data received; and
- adjust, in a non-uniform indirect manner, the current queue size ($Q\_{BTS}$) for the queue at the BTS based upon the calculated target queue size, wherein to adjust the current queue size ($Q\_{BTS}$), the controller is configured to transmit one or more messages from the BTS to a base station controller (BSC) over the backhaul network to increase or decrease an amount of data to be transmitted from the BSC to the BTS based upon the adjusted current queue size ($Q\_{BTS}$).

8. The device of claim 7, wherein the controller is configured to adjust the current queue size ($Q\_{BTS}$) for the queue at the BTS to reduce latency associated with the BTS transmitting data from the queue to one or more access terminals over one or more wireless carrier downlinks.

9. The device of claim 7, wherein the controller is configured to adjust the current queue size ($Q\_{BTS}$) for the queue at the BTS to reduce buffer underrun associated with the BTS transmitting data from the queue to one or more access terminals over one or more wireless carrier downlinks.

10. The device of claim 7, wherein the controller is configured to adjust the current queue size ($Q\_{BTS}$) for the queue at the BTS to increase throughput associated with the BTS communicating with one or more access terminals over one or more wireless carrier downlinks.

11. The device of claim 7, wherein the controller, the queue, the BTS, the BSC, and the backhaul network are part of a multi-carrier wireless system.

12. A device for enhanced backhaul flow control in a communication system, wherein the device comprises a controller configured to:
- calculate a target queue size (Target_$Q_{BTS}$) for a queue at a base transceiver station (BTS) coupled to a backhaul network based upon operating parameters for at least one predetermined event, wherein the at least one predetermined event is at least one of a time interval, an interval of an amount of data received, or a combination of the time interval and the interval of the amount of data received;
- selectively determine whether to enable or disable adjustment of a current queue size ($Q\_{BTS}$) for the queue at the BTS based upon the operating parameters for the at least one predetermined event; and
- adjust, in a non-uniform indirect manner, the current queue size ($Q\_{BTS}$) for the queue at the BTS based upon the calculated target queue size in response to enabling the adjustment of the current queue size ($Q\_{BTS}$), wherein the controller is configured to transmit one or more messages from the BTS to a base station controller (BSC) over the backhaul network to manage an amount of data to be transmitted from the BSC to the BTS to adjust the current queue size ($Q\_{BTS}$).

13. The device of claim 7, wherein the adjusted current queue size for the queue at the BTS has a value no smaller than a minimum ($Q\_{min}$) and no larger than a maximum ($Q\_{max}$).

14. The device of claim 7, wherein the controller, the queue, the BTS, the BSC, and the backhaul network are part of an internet protocol (IP) based communication system configured to operate in at least one of an internet protocol version 4 (Ipv4) system or an internet protocol version 6 (Ipv6) system.

15. A base transceiver station (BTS) for enhanced backhaul flow control in a communication system, comprising:
- a queue; and
- a controller configured to:
  - selectively determine whether to increase or decrease a current queue size ($Q_{13\ BTS}$) for the queue at the BTS based upon operating parameters for at least one predetermined event, wherein the BTS is coupled to a backhaul network;
  - calculate a target queue size (Target$_{13}Q_{BTS}$) for the queue at the BTS based upon the controller selectively determining to increase or decrease the current queue size ($Q_{13\ BTS}$) and further based upon the operating parameters for the at least one predetermined event, wherein the at least one predetermined event is at least one of a time interval, an interval of an amount of data received, or a combination of the time interval and the interval of the amount of data received; and
  - adjust, in a non-uniform indirect manner, the current queue ($Q\_{BTS}$) for the queue at the BTS based upon the calculated target queue size, wherein to adjust the current queue size ($Q\_{BTS}$), the controller is configured to transmit one or more messages from the BTS to a base station controller (BSC) over the backhaul network to increase or decrease an amount of data to be transmitted from the BSC to the BTS based upon the adjusted current queue size ($Q\_{BTS}$).

16. The BTS of claim 15, wherein the controller is configured to adjust the current queue size ($Q_{BTS}$) to reduce latency associated with the BTS transmitting data from the queue to one or more access terminals over one or more wireless carrier downlinks.

17. The BTS of claim 15, wherein the controller is configured to adjust the current queue size (Q_BTS) to reduce buffer underrun associated with the BTS transmitting data from the queue to one or more access terminals over one or more wireless carrier downlinks.

18. The BTS of claim 15, wherein the controller is configured to adjust the current queue size (Q_BTS) to increase throughput associated with the BTS communicating with one or more access terminals over one or more wireless carrier downlinks.

19. The BTS of claim 15, wherein the BTS, the BSC, and the backhaul network are part of a multi-carrier wireless system.

20. A base transceiver station (BTS) for enhanced backhaul flow control in a communication system, comprising:
    a queue; and
    a controller configured to:
        calculate a target queue size (Target_$Q_{BTS}$) for the queue at the BTS based upon operating parameters for at least one predetermined event, wherein the BTS is coupled to a backhaul network, and wherein the at least one predetermined event is at least one of a time interval, an interval of an amount of data received, or a combination of the time interval and the interval of the amount of data received;
        selectively determine whether to enable or disable adjustment of a current queue size (Q_BTS) for the queue at the BTS based upon the operating parameters for the at least one predetermined event; and
        adjust, in a non-uniform indirect manner, the current queue size ($Q_{BTS}$) for the queue at the BTS based upon the calculated target queue size in response to enabling the adjustment of the current queue size ($Q_{BTS}$), wherein the controller is configured to transmit one or more messages from the BTS to a base station controller (BSC) over the backhaul network to manage an amount of data to be transmitted from the BSC to the BTS to adjust the current queue size ($Q_{BTS}$).

21. The BTS of claim 15, wherein the adjusted current queue size has a value no smaller than a minimum ($Q_{min}$) and no larger than a maximum ($Q_{max}$).

22. The BTS of claim 15, wherein the BTS, the BSC, and the backhaul network are part of an internet protocol (IP) based communication system configured to operate in at least one of an internet protocol version 4 (Ipv4) system or an internet protocol version 6 (Ipv6) system.

23. A device for enhanced backhaul flow control in a communication system, comprising:
    means for selectively determining whether to increase or decrease a current queue size ($Q_{BTS}$) for a queue at a base transceiver station (BTS) coupled to a backhaul network based upon operating parameters for at least one predetermined event;
    means for calculating a target queue size (Target_$Q_{BTS}$) for the queue at the BTS based upon the means for selectively determining increasing or decreasing the current queue size ($Q_{BTS}$) and further based upon the operating parameters for the at least one predetermined event, wherein the at least one predetermined event is at least one of a time interval, an interval of an amount of data received, or a combination of the time interval and the interval of the amount of data received; and
    means for adjusting, in a non-uniform indirect manner, the current queue size ($Q_{BTS}$) for the queue at the BTS based upon the calculated target queue size, wherein the means for adjusting the current queue size ($Q_{BTS}$) includes means for transmitting one or more messages from the BTS to a base station controller (BSC) over the backhaul network to increase or decrease an amount of data to be transmitted from the BSC to the BTS based upon the adjusted current queue size ($Q_{BTS}$).

24. The device of claim 23, wherein the means for adjusting the current queue size ($Q_{BTS}$) for the queue at the BTS reduces latency associated with the BTS transmitting data from the queue to one or more access terminals over one or more wireless carrier downlinks.

25. The device of claim 23, wherein the means for adjusting the current queue size ($Q_{BTS}$) for the queue at the BTS reduces buffer underrun associated with the BTS transmitting data from the queue to one or more access terminals over one or more wireless carrier downlinks.

26. The device of claim 23, wherein the means for adjusting the current queue size ($Q_{BTS}$) for the queue at the BTS increases throughput associated with the BTS communicating with one or more access terminals over one or more wireless carrier downlinks.

27. A device for enhanced backhaul flow control in a communication system, comprising:
    means for calculating a target queue size (Target_$Q_{BTS}$) for a queue at a base transceiver station (BTS) coupled to a backhaul network based upon operating parameters for at least one predetermined event, wherein the at least one predetermined event is at least one of a time interval, an interval of an amount of data received, or a combination of the time interval and the interval of the amount of data received;
    means for selectively determining whether to enable or disable adjustment of a current queue size ($Q_{BTS}$) for the queue at the BTS based upon the operating parameters for the at least one predetermined event; and
    means for adjusting, in a non-uniform indirect manner, the current queue size ($Q_{BTS}$) for the queue at the BTS based upon the calculated target queue size in response to the means for selectively determining enabling the adjustment of the current queue size ($Q_{BTS}$), wherein the means for adjusting the current queue size ($Q_{BTS}$) includes means for transmitting one or more messages from the BTS to a base station controller (BSC) over the backhaul network to manage an amount of data to be transmitted from the BSC to the BTS.

28. The device of claim 23, wherein the adjusted current queue has a value no smaller than a minimum ($Q_{min}$) and no larger than a maximum ($Q_{max}$).

29. A non-transitory machine-readable medium for enhanced backhaul flow control in a communication system, the non-transitory machine-readable medium encoded with instructions which, when executed by a machine, cause the machine to:
    selectively determine whether to increase or decrease a current queue size ($Q_{BTS}$) for a queue at a base transceiver station (BTS) coupled to a backhaul network based upon operating parameters for at least one predetermined event;
    calculate a target queue size (Target_$Q_{BTS}$) for the queue at the BTS based upon the instructions causing the machine to selectively determine to increase or decrease the current queue size ($Q_{BTS}$) and further based upon the operating parameters for the at least one predetermined event, wherein the at least one predetermined event is at least one of a time interval, an interval of an amount of data received, or a combination of the time interval and the interval of the amount of data received; and adjust, in a non-uniform indirect manner, the current queue size ($Q_{\_BTS}$) for the queue at the BTS based upon the calculated target queue size, wherein the instructions which cause the machine to adjust the current queue size (Q_BTS) further cause the machine to transmit one or more messages from the BTS to a base station controller (BSC) over the backhaul network to increase or decrease an amount of data to be transmitted from the BSC to the BTS based upon the adjusted current queue size ($Q_{\_BTS}$).

30. A non-transitory machine-readable medium for enhanced backhaul flow control in a communication system, the non-transitory machine-readable medium encoded with instructions which, when executed on a machine, cause the machine to:

calculate a target queue size (Target_$Q_{BTS}$) for a queue at a base transceiver station (BTS) coupled to a backhaul network based upon operating parameters for at least one predetermined event, wherein the at least one predetermined event is at least one of a time interval, an interval of an amount of data received, or a combination of the time interval and the interval of the amount of data received;

selectively determine whether to enable or disable adjustment of a current queue size ($Q_{\_BTS}$) for the queue at the BTS based upon the operating parameters for the at least one predetermined event; and adjust, in a non-uniform indirect manner, a current queue size ($Q_{\_BTS}$) for the queue at the BTS based upon the calculated target queue size in response to the instructions causing the machine to enable adjustment of the current queue size ($Q_{\_BTS}$), wherein the instructions which cause the machine to adjust the current queue size ($Q_{\_BTS}$) further cause the machine to transmit one or more messages from the BTS to a base station controller (BSC) over the backhaul network to manage an amount of data to be transmitted from the BSC to the BTS.

31. The non-transitory machine-readable medium of claim 29, wherein the adjusted current queue size ($Q_{\_BTS}$) has a value no smaller than a minimum ($Q_{\_min}$) and no larger than a maximum ($Q_{\_max}$).

* * * * *